United States Patent
Mitsui

(10) Patent No.: US 8,290,242 B2
(45) Date of Patent: Oct. 16, 2012

(54) DEFECT INSPECTION APPARATUS AND DEFECT INSPECTION METHOD

(75) Inventor: Tadashi Mitsui, Kamakura (JP)

(73) Assignee: Kabushiki Kaisha Toshiba, Tokyo (JP)

(*) Notice: Subject to any disclaimer, the term of this patent is extended or adjusted under 35 U.S.C. 154(b) by 602 days.

(21) Appl. No.: 12/564,842

(22) Filed: Sep. 22, 2009

(65) Prior Publication Data

US 2010/0177952 A1 Jul. 15, 2010

(30) Foreign Application Priority Data

Jan. 13, 2009 (JP) ................................. 2009-004802

(51) Int. Cl.
*G06K 9/00* (2006.01)
(52) U.S. Cl. .................... 382/149; 382/141; 382/145
(58) Field of Classification Search .................. 382/141, 382/145, 149
See application file for complete search history.

(56) References Cited

U.S. PATENT DOCUMENTS

| 5,799,104 A * | 8/1998 | Nakamura et al. ........... 382/144 |
| 6,868,175 B1 | 3/2005 | Yamamoto et al. |
| 6,928,375 B2 * | 8/2005 | Ono et al. ...................... 702/81 |
| 2005/0195396 A1* | 9/2005 | Ono et al. ..................... 356/394 |

FOREIGN PATENT DOCUMENTS

| JP | 2002-365786 | 12/2002 |
| JP | 2003-178314 | 6/2003 |
| JP | 2006-275952 | 10/2006 |

OTHER PUBLICATIONS

Hirano et al., "Methods for Structural Analysis of Digital Figures Using Distance Transformation," Medical Imaging Technology (Jan. 2002), 20:13-22.

* cited by examiner

*Primary Examiner* — Roy M Punnoose
(74) *Attorney, Agent, or Firm* — Finnegan, Henderson, Farabow, Garrett & Dunner, L.L.P.

(57) ABSTRACT

A defect inspection method includes: acquiring an image of an inspection pattern obtained by an imaging device, detecting an edge of the inspection pattern in the image, dividing the image into an inspection region and a non-inspection region, using the detected edge as a boundary thereof, performing image processing only on the inspection region to determine the intensity value distribution in the image, and detecting a defect in the inspection pattern based on the obtained intensity value distribution.

15 Claims, 9 Drawing Sheets

DEFECT INSPECTION APPARATUS AND DEFECT INSPECTION METHOD

CROSS REFERENCE TO RELATED APPLICATION

This application claims benefit of priority under 35§119 to Japanese patent application No. 2009-004802, filed on Jan. 13, 2009, the contents of which are incorporated by reference herein.

BACKGROUND OF THE INVENTION

1. Field of the Invention

The present invention relates to a defect inspection apparatus and a defect inspection method.

2. Related Background Art

As the sizes of semiconductor patterns are becoming smaller in recent years, the sizes of defects that affect the performance of semiconductor products are also becoming smaller. Therefore, it is becoming more difficult to detect such minute-size defects with a conventional inspection apparatus. Most of the conventional inspection methods are based on a comparison between an inspection pattern and a reference pattern. Such conventional inspection methods include a die-to-die method involving a die as a reference pattern adjacent to an inspection pattern (see Japanese Patent Laid-Open Pub. No. 2002-365786, for example), and a die-to-database method involving design data as a reference pattern.

However, there are some problems with each of those methods.

For example, by the die-to-die method, an inspection cannot be performed if there are no chips having the same pattern, as disclosed in Japanese Patent Laid-Open Pub. No. 2002-365786. Even if there are chips having the same pattern, there are minute fluctuations in the pattern shape of each pattern due to uncontrollable process fluctuations such as roughness, thereby no two patterns are completely the same. Thus, it is difficult to distinguish defects from the minute changes when minute-size defects are to be detected. This is one of the reasons that pseudo defects are caused in defect inspections.

By the die-to-database method, on the other hand, a computer aided design (CAD) pattern is referred to. Though no minute fluctuations are caused in the reference pattern, there is normally a large difference in shape between a CAD pattern and an inspection pattern. As a result, pseudo defects also become a serious problem when minute-size defects are to be detected.

Furthermore, the die-to-die method and the die-to-database method share a common problem that a reference/comparison pattern needs to be obtained separately from an inspection pattern, or needs to be prepared in advance. Such a troublesome procedure leads to an increase in inspection time, and an increase in inspection costs.

SUMMARY OF THE INVENTION

According to a first aspect of the present invention, there is provided a defect inspection method comprising:

acquiring an image of an inspection pattern obtained by an imaging device;

detecting an edge of the inspection pattern in the image;

dividing the image into an inspection region and a non-inspection region, using the detected edge as a boundary thereof;

performing image processing only on the inspection region to determine the intensity value distribution in the image; and detecting a defect in the inspection pattern based on the obtained intensity value distribution.

According to a second aspect of the present invention, there is provided a defect inspection method comprising:

generating an intensity value distribution acquirement line of a region in which a pattern is formed or a region in which a pattern is not formed, with respect to design data of an inspection pattern;

obtaining an image of the inspection pattern through an imaging device;

detecting an edge of the inspection pattern in the image;

performing matching between the edge of the inspection pattern and an edge of the design data;

calculating an intensity value distribution along the intensity value distribution acquirement line of the design data; and detecting a defect in the inspection pattern by identifying a portion at which the intensity value distribution along the intensity value distribution acquirement line locally varies.

According to a third aspect of the present invention, there is provided a defect inspection apparatus comprising:

an edge detection unit which receives an image of an inspection pattern, and detects an edge of the inspection pattern in the image;

a region divider which divides the image into an inspection region and a non-inspection region, using the detected edge as a boundary thereof; and a defect detection unit which performs image processing only on the inspection region, and detects a defect in the inspection pattern based on an intensity value distribution that is obtained through the image processing.

DETAILED DESCRIPTION OF THE INVENTION

Figure 1:
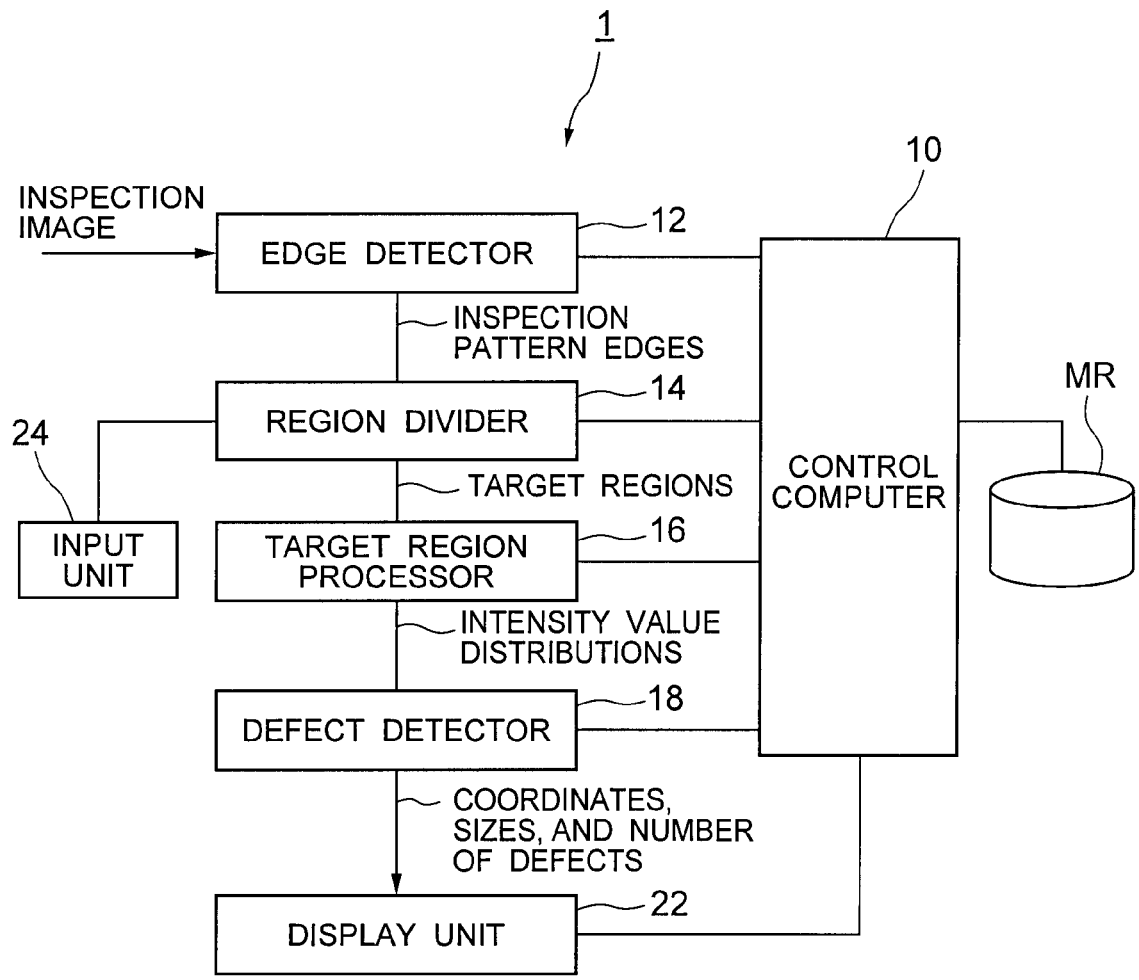
FIG. 1 is a block diagram schematically showing the structure of a defect inspection apparatus according to a first embodiment of the present invention.

The following is a description of embodiments of the present invention, with reference to the accompanying drawings. In the following, defect inspections carried out on minute patterns formed by a semiconductor manufacture process including a lithography procedure and an etching procedure are taken as specific examples. However, the present invention is not limited to the field of semiconductor device manufacture, but is to provide a pattern defect inspection method suitable in various other fields involving image processing, and an apparatus for implementing such a method. Like components are denoted by same reference numerals in the accompanying drawings, and a repetitive explanation of the same component is appropriately omitted in the following description.

(1) First Embodiment

FIG. 1 is a block diagram schematically showing the structure of a defect inspection apparatus according to a first embodiment of the present invention. The defect inspection apparatus 1 shown in FIG. 1 includes a control computer 10, an edge detector 12, a region divider 14, a target region processor 16, a defect detector 18, and a display unit 22.

The control computer 10 is connected to the edge detector 12, the region divider 14, the target region processor 16, the defect detector 18, and the display unit 22, and controls those components. The control computer 10 is also connected to a memory MR. The memory MR stores an inspection recipe in which specific procedures for implementing the later described defect inspection method is described. The control computer 10 reads the inspection recipe from the memory MR, and generates various control signals. The control computer 10 supplies those control signals to the above components, so as to carry out defect inspections.

The edge detector 12 receives an image of an inspection pattern from an external imaging device (not shown), and detects the edges in the pattern to be inspected from the inspection image.

In general, an image of an inspection pattern is acquired through an optical microscope or an electron beam (EB) microscope. To detect minute defects, it is necessary to use an EB imaging device that excels an optical microscope in resolution. In the present embodiment, a critical dimension scanning electron microscope (CDSEM) is used as an EB imaging device. However, an inspection image acquired through some other EB imaging device such as an EB defect inspection apparatus may be used.

The region divider 14 is connected to the edge detector 12, and receives the edge information about the inspection pattern. The region divider 14 divides the inspection image into inspection regions and non-inspection regions, using the edges in the inspection pattern as the boundaries of these regions. The region divider 14 is further connected to an input unit 24. Through an operation performed by an operator via the input unit 24, the region divider 14 designates regions (hereinafter referred to as the "target regions") that draw attention of the operator in the inspection regions.

The target region processor 16 is connected to the region divider 14, and receives the information about the target regions. The target region processor 16 performs the later described image processing only on the target regions, and calculates the intensity value distribution in the images in the target regions.

The defect detector 18 is connected to the target region processor 16 and the display unit 22, and receives the intensity value distribution of the inspection image from the target region processor 16. The defect detector 18 outputs the information about the coordinates, the size, and the number of defects, and causes the display unit 22 to display the information on a liquid crystal display or the like. In the present embodiment, the target region processor 16 and the defect detector 18 correspond to, e.g. a defect detection unit.

A defect inspection method involving the defect inspection apparatus 1 is described below as the defect inspection method according to the first embodiment of the present invention. In the following description an example case is cited where hole-like defects that can be formed at the space portions in a line-and-space pattern in a shallow trench insulator (STI) are detected.

Figure 2:
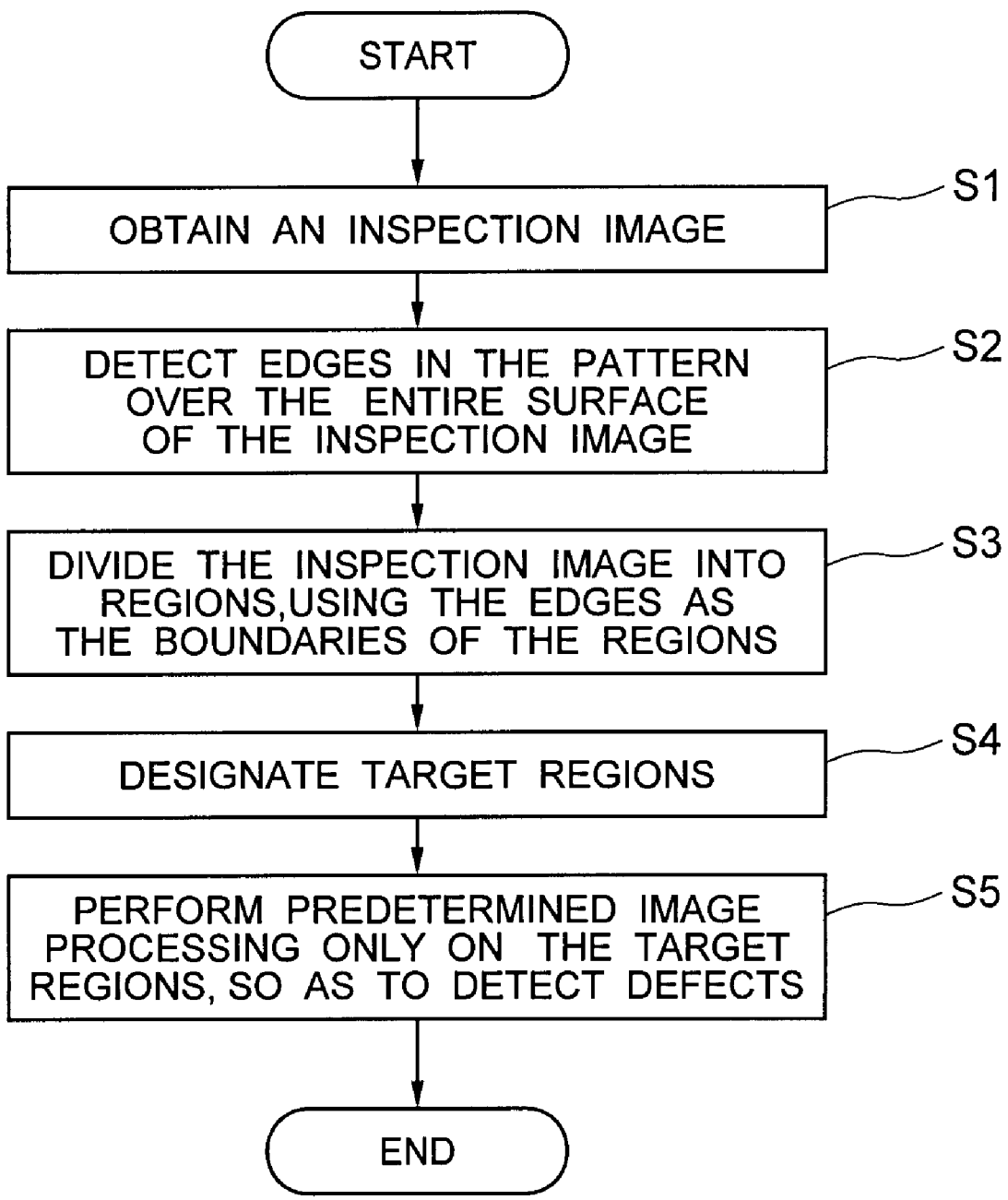
FIG. 2 is a flowchart showing the procedures in a defect inspection method according to the first embodiment of the present invention.

FIG. 2 is a flowchart showing the overview procedures according to the defect inspection method of the present embodiment.

First, an image of an inspection pattern is acquired through an external imaging device (not shown) (step S1). The image is input to the edge detector 12, and the edge detector 12 detects the edges in the inspection pattern (step S2). Any technique may be used to detect the edge, as long as the edges in the entire pattern over the entire image surface can be detected. Since the pattern used in the present embodiment is a line-and-space pattern, edge detection may be carried out by a conventional threshold approach. In the case of a more complicated pattern, it is desirable to use the technique disclosed in Japanese Patent Laid-Open Pub. No. 2003-178314, for example. By this reference, the entire contents of Japanese Patent Laid-Open Pub. No. 2003-178314 is incorporated in this specification.

The region divider 14 then divides the inspection image into two or more regions, using the edges detected at step S2 as the boundaries of these regions (step S3). The region divider 14 further classifies the divisional regions into line portions (denoted by L1 through L4 in FIG. 4) and space portions (denoted by S1 through S3 in FIG. 4). To determine whether a region is a line portion or a space portion, a technique for detecting the gray value difference between the line portions and the space portion in the pattern is used in the present embodiment. More specifically, since the gray value in a line portion is normally greater (brighter) than the gray value in a space portion, the mean gray values in the regions divided by the boundaries are classified into two groups. The portions having the greater mean gray value are set as the line portions, and the portions having the smaller mean gray value are set as the space portions.

The target region processor 16 then identifies the target regions for an inspection from the classified regions (step S4). Since defects existing in the space portions in the pattern are to be detected in the present embodiment, attention is drawn to the regions of the space portions, and the regions of the line portions are excluded from the objects to be inspected. To detect defects existing in the line portions, the line portions are set as the target regions, and both regions may be of course set as the target regions if necessary.

Lastly, the target region processor 16 performs predetermined image processing only on the target regions, so as to detect defects (step S5). Any type of image processing may be performed, as long as the intensity value distributions of the defective portions can be obtained. Referring now to FIGS. 3 through 8, an example method for obtaining the intensity value distributions of defects along center lines drawn in the respective target regions is described in detail.

Figure 3:
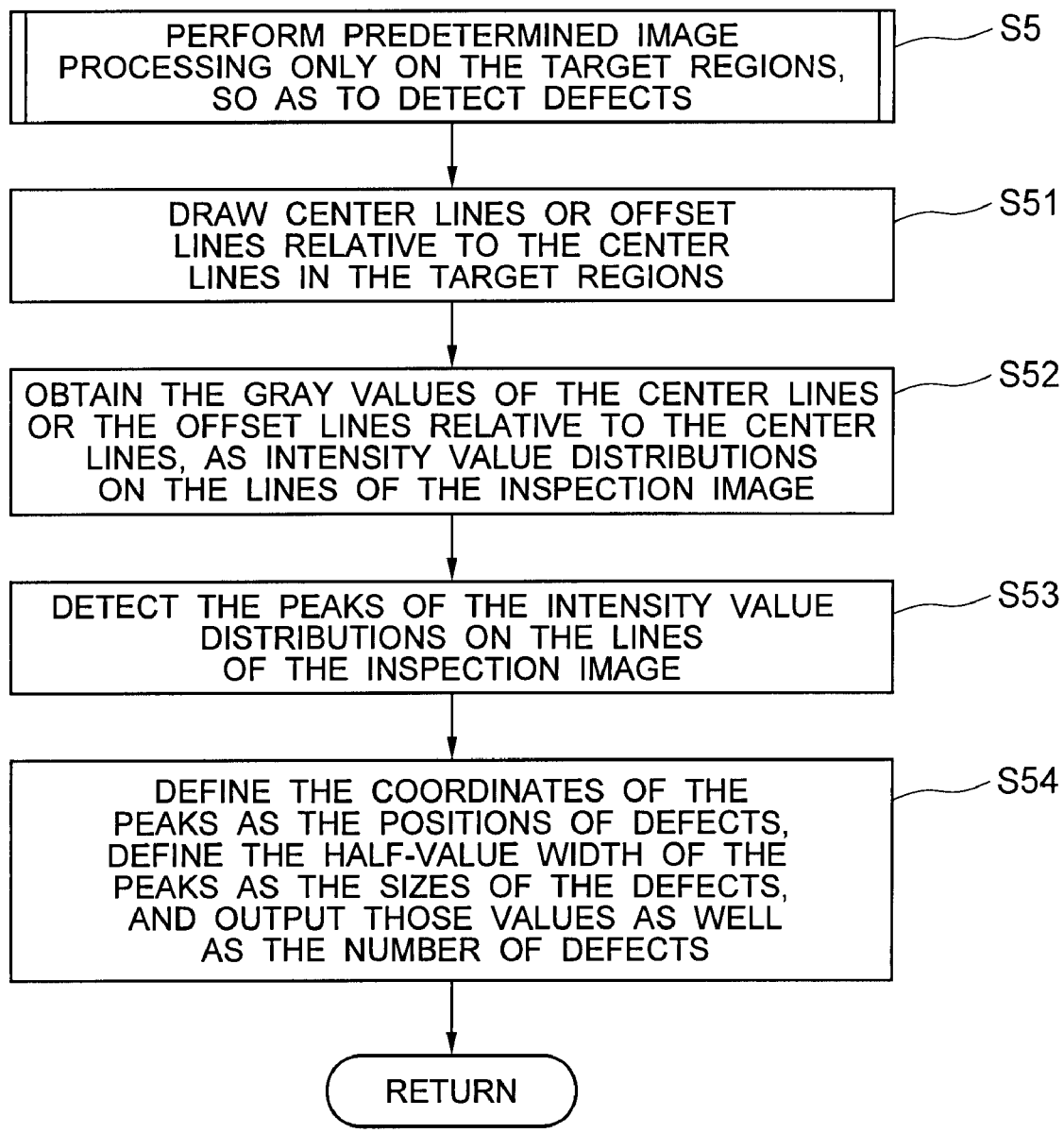
FIG. 3 is a flowchart showing more specific procedures to be carried out in the image processing performed only on the target regions in one of the procedures shown in FIG. 2.
Figure 4:
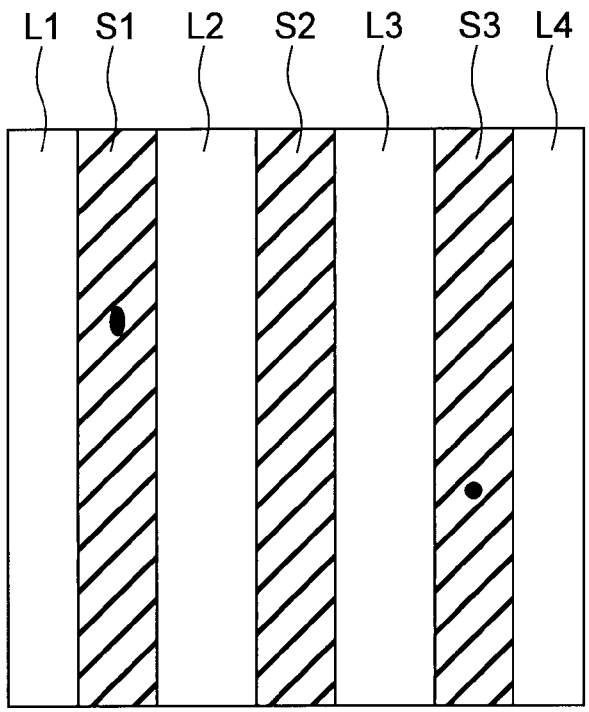
FIG. 4 is a schematic view for explaining one of the procedures shown in FIG. 2.

FIG. 3 is a flowchart showing the specific procedures for performing image processing only on the target regions in the operation illustrated in FIG. 2. FIG. 4 shows an example of an inspection image that is divided into several regions with the pattern edges being the boundaries of the divided regions. In the inspection image of FIG. 4, a line-and-space pattern image is divided into the line portions L1 through L4 and the space portions S1 through S3. Here, an operator selects the space portions S1 through S3 as the target regions.

Figure 5:
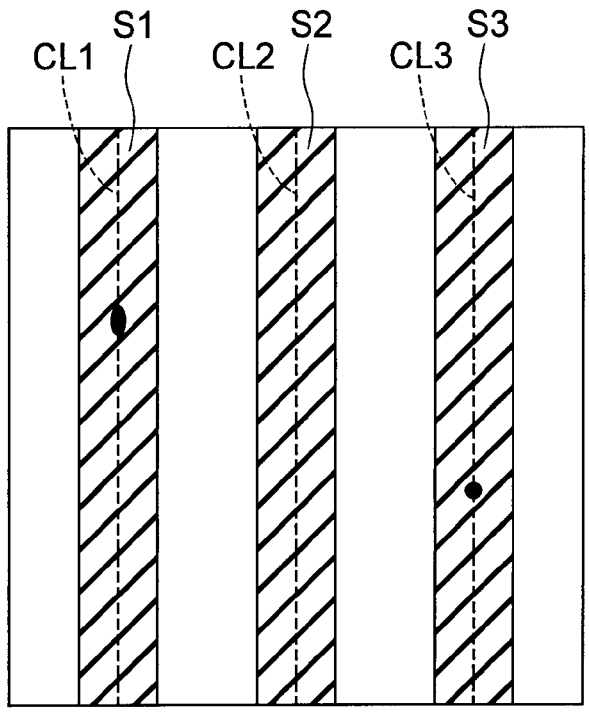
FIG. 5 is a schematic view for explaining one of the procedures shown in FIG. 3.

First, the target region processor 16 draws center lines CL1 through CL3 in the target regions S1 through S3, respectively, as shown in FIG. 5 (step S51). The center lines in the present embodiment are defined as the results obtained by performing a distance transformation on the boundaries of the space portions S1 through S3 and then performing a thinning process on the resultant image. These processes are explained in detail in the following reference, for example:

Yasushi Hirano, et al., "METHODS FOR STRUCTURAL ANALYSIS OF DIGITAL FIGURES USING DISTANCE TRANSFORMATION", Special Issue in Basic Technology for CAD System Configurations, MEDICAL IMAGING TECHNOLOGY, Vol. 20, No. 1, Jan. 2002

According to the technique disclosed in this reference, some branches might be formed in the center lines, depending on the shape of the pattern (or the regions). In such a case, it is preferable to eliminate the branches. In some other cases, it becomes necessary to add an offset line at a predetermined distance from each center line, depending on the properties of the defects to be detected.

The target region processor 16 then obtains the gray values of the center lines drawn in the above manner or the offset lines drawn at a distance from each center line, as the intensity value distributions of the inspection image (step S52). In the example illustrated in FIG. 6, defects exist only in the space portions S1 and S3 among the space portions S1 through S3, and accordingly, intensity value distributions LP1 and LP3 are obtained on lines CL1 and CL3.

In obtaining the intensity value distributions here, lines parallel to the center lines are further drawn at predetermined intervals, and gray values are obtained along the lines. The obtained gray values are added to the gray values obtained along the center lines. The sum total of the gray values is divided by the number of lines from which intensity value distributions are obtained or the total number of the center lines and the further drawn lines, to calculate the mean intensity value distribution of the inspection image with the total width of the predetermined intervals. Referring now to the partially enlarged view shown in FIG. 7, this aspect of the embodiment is described below in greater detail.

Figure 6:
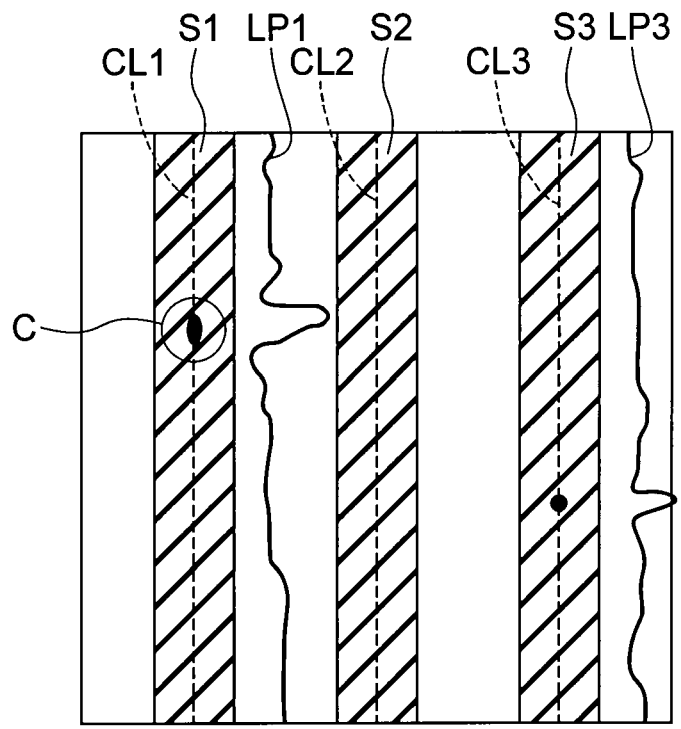
FIG. 6 is a schematic view for explaining one of the procedures shown in FIG. 3.
Figure 7:
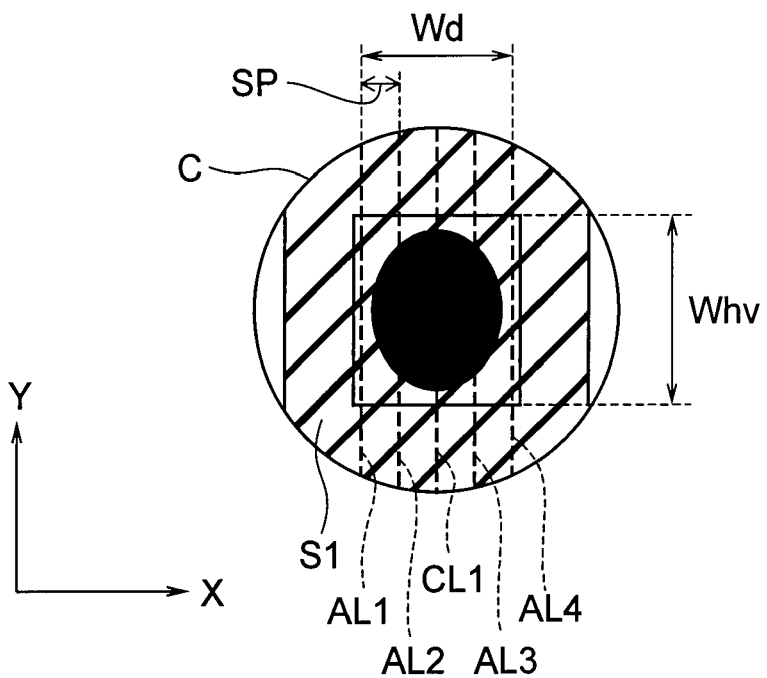
FIG. 7 is a partially enlarged view of the illustration shown in FIG. 6.

FIG. 7 is an enlarged view of the region denoted by C in FIG. 6. Here, the center line CL1 is a straight line parallel to the Y-direction. Lines AL1 through AL4 parallel to the center line CL1 are further drawn at predetermined intervals SP. The gray values are obtained along the lines CL1, and AL1 through AL4, and the gray values corresponding to the same X-coordinate are summed up and the sum total is divided by 5. In this manner, the mean intensity value distribution in the designated width Wd (=SP×4) is obtained. Accordingly, the influence of noise and the likes in the intensity value distribution can be effectively reduced. Hereinafter, the obtained lines CL1 through CL3 of FIG. 5 and the lines AL1 through AL4 of FIG. 7 will be referred to as the "intensity value distribution acquirement lines" for acquiring intensity value distributions.

The target region processor 16 then detects the peaks of the obtained intensity value distributions (step S53 in FIG. 3). In the example illustrated in FIG. 6, the peaks of the intensity value distributions LP1 and LP3 on the obtained lines CL1 and CL3 are detected as defects DF1 and DF2 shown in FIG. 8.

Figure 8:
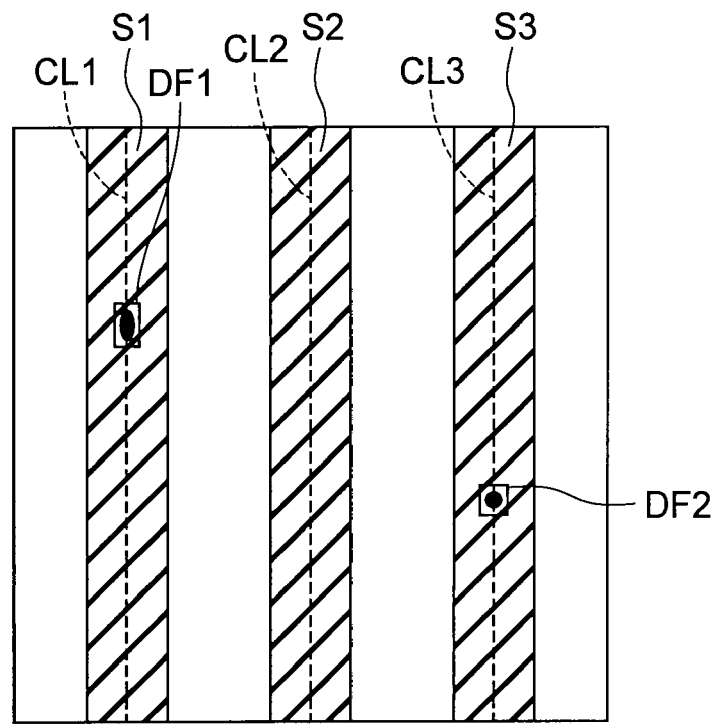
FIG. 8 is a schematic view for explaining one of the procedures shown in FIG. 3.

In the present embodiment, the defects to be detected are hole-like defects, and the efficiency of secondary electron emission from those defects is low. Therefore, those defects appear dark in the inspection image. In view of this, the target region processor 16 detects the portions having gray values locally lower than the gray values of the intensity value distributions LP1 and LP3 on the lines. The detection here may be performed by a generally known peak detection technique. Also, in the present embodiment, preprocessing such as one-dimensional finite impulse response filtering (finite impulse response filter (FIR) filtering) or the like is performed prior to the detection, so that the signals from the defects can be easily separated from noise. As shown in FIGS. 6 and 8, the coordinates of the peaks in the intensity value distributions LP1 and LP3 on the lines correspond to the positions of the defects DF1 and DF2, respectively, and the half-value widths (denoted by Whv in FIG. 7) of the peaks correspond to the sizes of the defects DF1 and DF2, respectively.

The target region processor 16 outputs the coordinates and sizes of the defects obtained in the above manner, as well as the number of defects (step S54 in FIG. 3). The display unit 22 visualizes and displays the information about those defects.

As described above, according to the present embodiment, minute defects in a pattern to be inspected can be detected with high sensitivity, without special data except for the inspection image.

Figure 9:
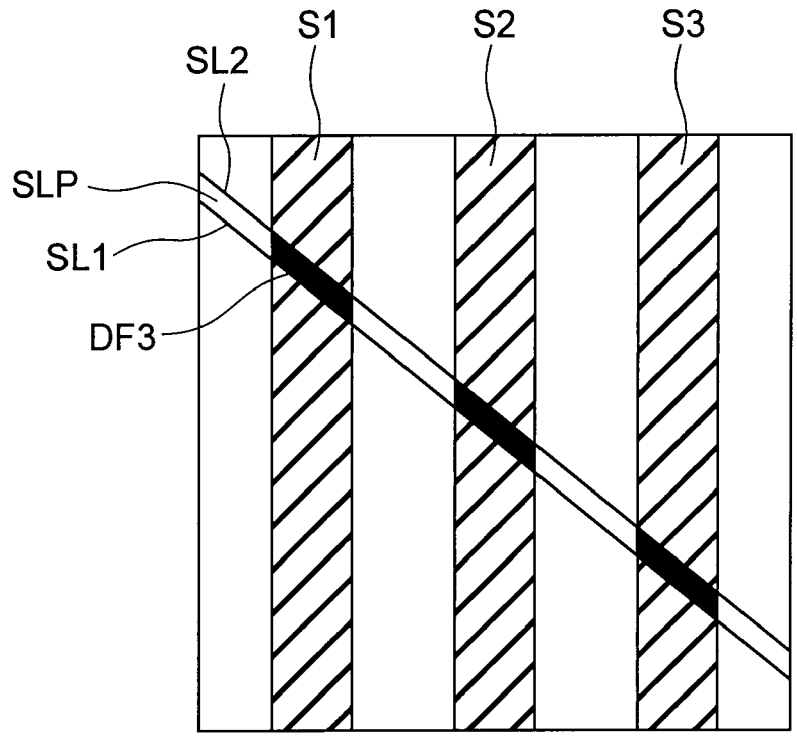
FIG. 9 is a schematic view for explaining a method for detecting a scratch-like defect through the procedures shown in FIG. 2.

In the above description, center lines are drawn in target regions, and intensity value distributions are obtained by calculating the gray value of the image along the center lines. However, depending on the type of defects to be detected, defects may be detected by performing image processing only on the target regions, without defining the center line. For example, to detect the scratch defect DF3 shown in FIG. 9, a straight-line portion SLP in the region is detected through a Hough transform, and the intensity value distribution of each of the target regions S1 through S3 can be obtained with the use of the straight-line portion SLP. In the example illustrated in FIG. 9, the straight lines SL1 and SL2 defining the straight-line portion SLP correspond to the intensity value distribution acquirement lines, for example.

Also, in the above description, a line-and-space pattern in a STI is described. However, in the case where defects caused during sidewall mask processing are to be detected, a pattern portion and an underlayer portion correspond to the regions divided at the pattern edges serving as the boundaries.

(2) Second Embodiment

Figure 10:
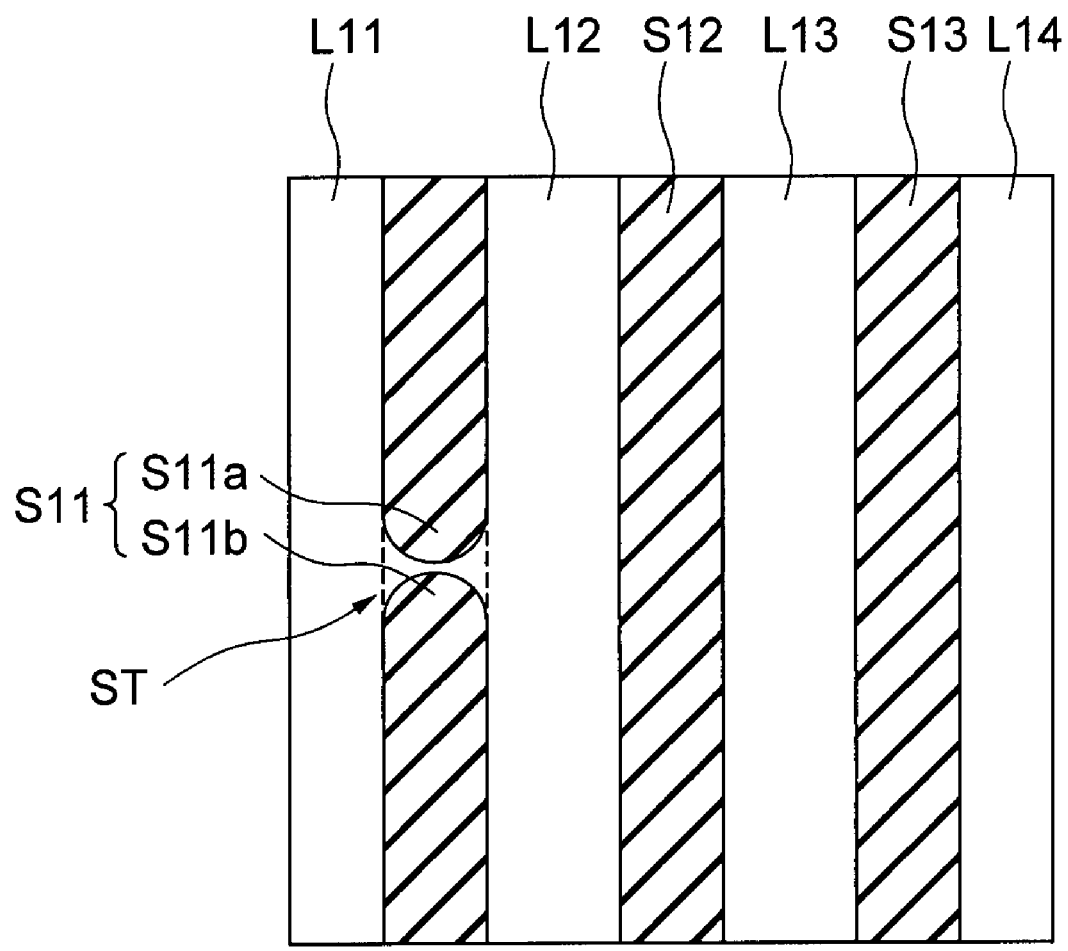
FIG. 10 shows an example of a pattern to which a second embodiment of the present invention is applied.

In the first embodiment, defects exist in a pattern. However, as indicated by the defect denoted by ST in FIG. 10, a line portion L11 and a line portion L12 might be short-circuited across a space portion S11. In such a case, the inspection region obtained from the space portion between the line portion L11 and the line portion L12 is divided into the three regions of the region of the short-circuited defect ST and inspection regions S11a and S11b vertically divided by the short-circuited defect ST. According to the method of the first embodiment, the intensity value distribution on the line of each region is obtained, and a peak is detected from the intensity value distribution on the line. Therefore, the short-circuited defect ST cannot be detected. In the present embodiment, the design data is used to enable defect detection in such a case.

Figure 11:
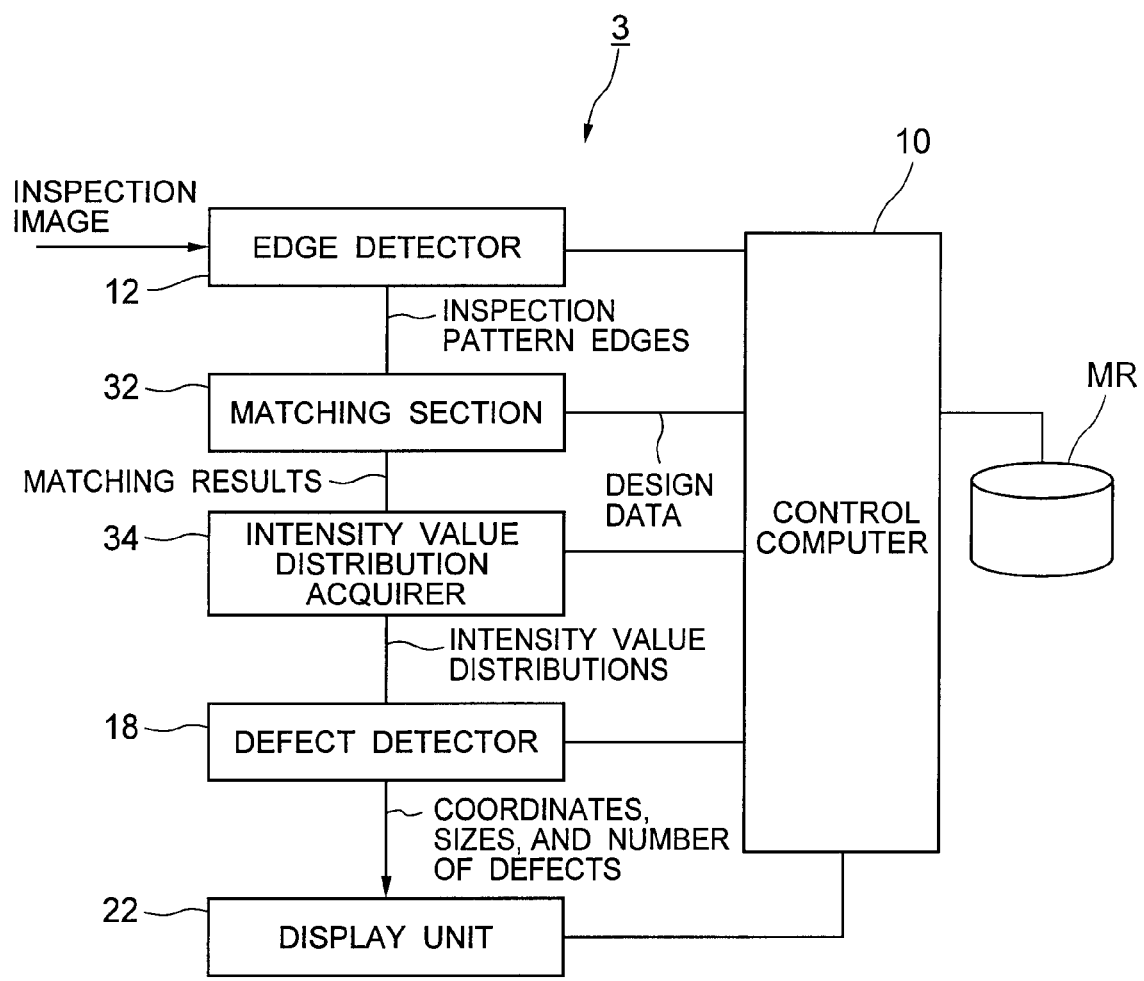
FIG. 11 is a block diagram schematically showing the structure of a defect inspection apparatus according to the second embodiment of the present invention.

FIG. 11 is a block diagram schematically showing the structure of a defect inspection apparatus according to the present embodiment. As is apparent from a comparison with FIG. 1, the defect inspection apparatus 3 shown in FIG. 11 characteristically includes a matching section 32 and an intensity value distribution acquirer 34, instead of the region divider 14 and the target region processor 16 of FIG. 1. Also, the memory MR stores the design data (CAD data) about inspection patterns, as well as the later described inspection recipe of the present embodiment. The other aspects of the defect inspection apparatus 3 are substantially the same as those of the defect inspection apparatus 1 shown in FIG. 1.

The matching section 32 is connected to the control computer 10 and the edge detector 12, and receives an inspection pattern design data from the memory MR via the control computer 10. The matching section 32 performs matching between the edges in the inspection pattern according to the design data and the edges of the inspection pattern in an inspection image detected by the edge detector 12.

The intensity value distribution acquirer 34 is connected to the matching section 32, and receives the results of the matching. The intensity value distribution acquirer 34 then determines the intensity value distribution acquirement lines with respect to the positioned design data. The intensity value distribution acquirer 34 determines the intensity value distribution of the inspection image along the obtained intensity value distribution acquirement lines, and detects the peak of the intensity value distribution. In this manner, the intensity value distribution acquirer 34 detects the short-circuited defect ST, for example.

Figure 12:
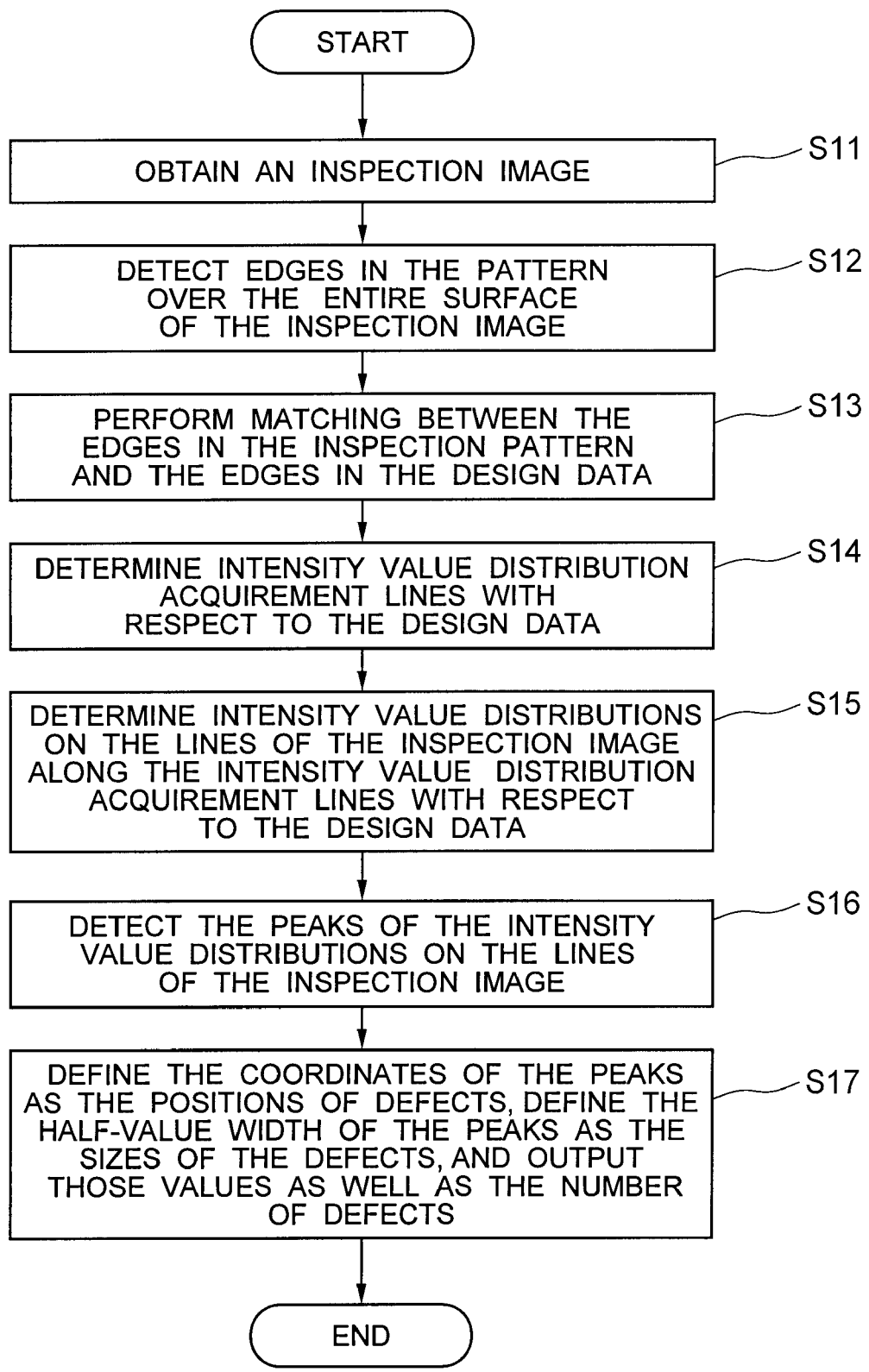
FIG. 12 is a flowchart showing the procedures in the defect inspection method according to the second embodiment of the present invention.

FIG. 12 is a flowchart showing the procedures in a defect inspection method according to the present embodiment.

First, as in the first embodiment, an inspection image of an inspection pattern is obtained through an external imaging device (not shown), and is input to the edge detector 12 (step S11). The edge detector 12 detects edges in the inspection pattern over the entire surface of the inspection image (step S12).

Then, the matching section 32 performs matching between the edges in the inspection pattern of the design data and the edges in the inspection pattern in the inspection image detected by the edge detector 12 (step S13). The matching between the design data and the inspection image may be performed by any known technique. However, high-precision matching can be performed in a short period of time by use of the method disclosed in Japanese Patent Laid-Open Pub. No. 2006-275952, for example. By this reference, the entire contents of Japanese Patent Laid-Open Pub. No. 2006-275952 is incorporated in this specification.

Subsequently, the intensity value distribution acquirer 34 determines the intensity value distribution acquirement lines with respect to the design data (step S14). As the intensity value distribution acquirement lines, the same lines as the center lines determined in the first embodiment may be used, or arbitrary lines that are written in advance as other layers in the design data may be used.

The intensity value distribution acquirer 34 then determines the intensity value distribution of the inspection image along the obtained intensity value distribution acquirement lines (step S15).

After that, defects are detected in the same manner as described in the first embodiment, based on the acquired intensity value distributions (steps S16 and S17).

As described above, according to the present embodiment, intensity value distribution acquirement lines are determined with the use of design data. Thus, short-circuited defects or open defects can be certainly detected.

(3) Program

The series of procedures in the above described defect inspection method may be incorporated in a program, and may be carried out by a computer which reads and executes the program. In this manner, the series of the procedures in the defect inspection method according to the present invention can be carried out with the use of a general-purpose computer that is capable of performing image processing. Also, a program for causing a computer to carry out the series of procedures in the above described defect inspection method may be stored in a recording medium such as a flexible disk or a CD-ROM, and a computer that is capable of performing image processing may read and execute the program. The recording medium used here is not limited to a portable medium such as a magnetic disk or an optical disk, and may be a stationary recording medium such as a hard disk device or a memory. Alternatively, the program in which the series of procedures of the above described defect inspection method are incorporated may be distributed via a communication line (including wireless communications) such as the Internet. The program in which the series of procedures of the above described defect inspection method may also be encrypted, modulated, or compressed, and may be then distributed via line or wireless communications such as the Internet, or may be stored in recording media to be distributed.

(4) Semiconductor Device Manufacture Method

By implementing the above defect inspection method in the procedures for manufacturing semiconductor devices, semiconductor devices can be manufactured with higher yield and higher throughput, since defects can be detected with high precision in a short period of time.

More specifically, a substrate is pulled out from each manufacturing lot, and an inspection is performed on the pattern formed on the pulled-out substrate by the above described defect inspection method. If any defect exceeding the threshold value set according to the product specification is not detected as a result of the inspection, the remaining manufacturing process is continued for the entire manufacturing lot to which the substrate having the pattern formed thereon belongs. On the other hand, if a defect exceeding the threshold value is detected as a result of the inspection, and a rework process can be performed, a rework process is performed on the manufacturing lot to which the substrate having the defect-containing pattern formed thereon belongs. After the rework process is completed, another substrate is pulled out from the manufacturing lot, and a pattern inspection is again performed. If any defect exceeding the threshold value is not detected from the substrate pulled out for the pattern reexamination, the remaining manufacturing process is performed on the manufacturing lot having been subjected to the rework process. If the rework process cannot be performed, the manufacturing lot to which the substrate having the defect-containing pattern formed thereon belongs is discarded. If the cause of the defect can be analyzed, the analysis result is fed back to the designer and a senior processing manager, for example.

(5) Others

Although embodiments of the present invention have been described so far, the present invention is not limited to those embodiments, and various modifications may be of course made to them within the scope of the invention. For example, the intensity value distribution acquirement lines in the above embodiments are the center lines of inspection regions or lines that are offset from the center lines. However, the intensity value distribution acquirement lines are not limited to them, and the skeletons of inspection regions may be used as intensity value distribution acquirement lines. Here, the skeleton of an inspection region is the aggregation of pixels having the largest pixel values (distance values) in the subject image where the inspection region is regarded as a pattern, and the edges in the pattern is subjected to a distance transformation. The technique for performing a distance transformation on pattern edges is disclosed in Japanese Patent Laid-Open Pub. No. 2006-275952, for example. By this reference, the entire contents of Japanese Patent Laid-Open Pub. No. 2006-275952 is incorporated in this specification.

What is claimed is:

1. A defect inspection method comprising:
   acquiring an image of an inspection pattern obtained by an imaging device;
   detecting an edge of the inspection pattern in the image;
   dividing the image into an inspection region and a non-inspection region, using the detected edge as a boundary thereof;
   performing image processing only on the inspection region to determine the intensity value distribution in the image; and
   detecting a defect in the inspection pattern based on the obtained intensity value distribution.

2. The method of claim 1,
   wherein the detecting the defect in the inspection pattern comprises generating an intensity value distribution acquirement line passing through the inspection region, calculating an intensity value distribution along the intensity value distribution acquirement line, and identifying a portion at which the intensity value distribution along the intensity value distribution acquirement line locally varies.

3. The method of claim 2,
   wherein the intensity value distribution acquirement line comprises a skeleton of the inspection region, or a center line of the inspection region, or a line that is offset with respect to the center line.

4. The method of claim 3,
   wherein the intensity value distribution acquirement line further comprises a line parallel to the skeleton, or the center line, or the line that is offset with respect to the center line; and
   the method further comprises averaging the intensity value distribution.

5. The method of claim 2, further comprising
   detecting a straight-line portion in the inspection region,
   wherein the intensity value distribution acquirement line comprises straight lines that define the straight-line portion.

6. The method of claim 1,
   wherein the inspection region is a pattern portion of the inspection pattern; and
   wherein the non-inspection region is an underlayer portion of the inspection pattern.

7. The method of claim 1,
   wherein the inspection region is an underlayer portion of the inspection pattern; and
   wherein the non-inspection region is a pattern portion of the inspection pattern.

8. The method of claim 1, wherein:
   wherein the inspection region is a pattern portion and an underlayer portion of the inspection pattern.

9. A defect inspection apparatus comprising:
   an edge detection unit which receives an image of an inspection pattern, and detects an edge of the inspection pattern in the image;
   a region divider which divides the image into an inspection region and a non-inspection region, using the detected edge as a boundary thereof; and
   a defect detection unit which performs image processing only on the inspection region, and detects a defect in the inspection pattern based on an intensity value distribution that is obtained through the image processing.

10. The apparatus of claim 9
    wherein the defect detection unit detects the defect in the inspection pattern by generating an intensity value distribution acquirement line passing through in the inspection region, calculating an intensity value distribution along the intensity value distribution acquirement line, and identifying a portion at which the intensity value distribution along the intensity value distribution acquirement line locally varies.

11. The apparatus of claim 10,
    wherein the intensity value distribution acquirement line comprises a skeleton of the inspection region, or a center line of the inspection region, or a line that is offset with respect to the center line.

12. The apparatus of claim 10,
    wherein the intensity value distribution acquirement line further comprises a line parallel to the skeleton of the inspection region, or the center line of the inspection region, or the line that is offset relative to the center line; and
    the defect detection unit calculates the intensity value distribution for each intensity value distribution acquirement line, sums up the intensity value distributions, divides the sum total by the number of intensity value distribution acquirement lines to obtain a mean intensity value distribution, and detects the defect in the inspection pattern based on the mean intensity value distribution.

13. The apparatus of claim 10,
    wherein the inspection region is a pattern portion of the inspection pattern; and
    wherein the non-inspection region is an underlayer portion of the inspection pattern.

14. The apparatus of claim 10,
    wherein the inspection region is an underlayer portion of the inspection pattern; and
    wherein the non-inspection region is a pattern portion of the inspection pattern.

15. The apparatus of claim 10,
    wherein the inspection region is a pattern portion and an underlayer portion of the inspection pattern.

* * * * *